(12) United States Patent
Feltham et al.

(10) Patent No.: US 9,881,490 B2
(45) Date of Patent: Jan. 30, 2018

(54) SYSTEM AND METHOD FOR PROVIDING TEMPORARY POWER TO INTERMITTENT UNITS

(71) Applicant: Tyco Fire & Security GmbH, Neuhausen am Rheinfall (CH)

(72) Inventors: Robert Feltham, Fort Lauderdale, FL (US); Martin Chiarizio, Coral Springs, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/152,099

(22) Filed: May 11, 2016

(65) Prior Publication Data

US 2017/0330450 A1     Nov. 16, 2017

(51) Int. Cl.
| | |
|---|---|
| *G08B 29/00* | (2006.01) |
| *G08B 29/18* | (2006.01) |
| *H02J 7/00* | (2006.01) |
| *G08B 17/10* | (2006.01) |
| *G08B 25/10* | (2006.01) |
| *G08B 29/04* | (2006.01) |

(52) U.S. Cl.
CPC ........... *G08B 29/181* (2013.01); *G08B 17/10* (2013.01); *G08B 25/10* (2013.01); *G08B 29/043* (2013.01); *H02J 7/007* (2013.01); *H02J 7/0068* (2013.01)

(58) Field of Classification Search
CPC ...... G08B 29/181; G08B 25/10; G08B 17/10; G08B 19/00
USPC ........ 340/509, 628, 632, 636, 508, 521, 541
See application file for complete search history.

(56) References Cited

U.S. PATENT DOCUMENTS

| | | | |
|---|---|---|---|
| 3,686,668 A * | 8/1972 | Durkee | G08B 19/00 340/293 |
| 4,491,830 A | 1/1985 | Miyabe | |
| 4,929,931 A | 5/1990 | McCuen | |
| 5,966,002 A * | 10/1999 | Barrieau | G05F 1/613 323/222 |
| 2015/0022368 A1* | 1/2015 | Smith | G05F 1/46 340/693.3 |
| 2015/0296599 A1 | 10/2015 | Recker et al. | |

FOREIGN PATENT DOCUMENTS

| | | |
|---|---|---|
| EP | 2 595 277 A1 | 5/2013 |
| WO | 2005/060067 A1 | 6/2005 |

OTHER PUBLICATIONS

International Search Report and the Written Opinion of the International Searching Authority, dated Jul. 26, 2017, from International Application No. PCT/IB2017/052215, filed on Apr. 18, 2017. Nineteen pages.

* cited by examiner

*Primary Examiner* — Tai T Nguyen
(74) *Attorney, Agent, or Firm* — HoustonHogle LLP

(57) ABSTRACT

A system and method for providing temporary power to an intermittent unit of a fire alarm system device. The intermittent unit is intermittently activated. The fire alarm system device includes a power storage unit for providing temporary power to the intermittent unit and a voltage converter for providing power at a voltage required by the intermittent unit. The fire alarm system device also includes a power control circuit for discharging the power storage unit through the intermittent unit when the intermittent unit first is activated and then switching to enable the voltage converter to power the intermittent unit.

29 Claims, 6 Drawing Sheets

SYSTEM AND METHOD FOR PROVIDING TEMPORARY POWER TO INTERMITTENT UNITS

BACKGROUND OF THE INVENTION

Fire alarm systems are often installed within commercial, residential, or governmental buildings, for instance. Examples of these buildings include hospitals, warehouses, schools, hotels, shopping malls, office buildings, and casinos. The fire alarm systems monitor for the existence of fire conditions, such as smoke or heat, and alert occupants when the fire conditions are detected.

Fire alarm systems include fire alarm system devices such as notification appliance devices for alerting occupants of a potential fire. Notification appliance devices include notification units that generate alert signals (e.g., audible signals or visible signals) for indicating an alarm (i.e., potential fire) to occupants.

Other fire alarm system devices include initiation devices that can detect fire conditions or be manually activated. One type of initiation device is a detector device that includes a sensor unit for detecting the existence of fire conditions (i.e., smoke or heat). Another type of initiation device is a notification/detector combination device that includes a notification unit and a smoke/heat sensor unit. Still another type of initiation device is a manually activated unit such as a fire alarm box/pull station.

System controllers of the fire alarm systems monitor the initiation devices and activate the notification appliance devices. For example, when fire conditions (i.e., smoke or heat) are detected by the initiation devices (e.g., detector devices and notification/detector combination devices), the initiation devices send alarm signals to the system controller. The system controller responds to the alarm signals by activating the notification appliance devices to generate the alert signals to indicate an alarm (i.e., alert occupants of potential fire).

The system controller communicates with the initiation devices and the notification appliance devices via wired and/or wireless networks. For example, in wired fire alarm systems, several initiation devices and notification appliance devices are wired to a common pair of system lines from the system controller. The system controller then communicates with the devices via the system lines. In wireless fire alarm systems, the system controller communicates wirelessly with the devices possibly via a wireless access point.

For wired fire alarm systems, the system controller usually provides power to the initiation devices and notification appliance devices via the system lines. Typically, the system controller has a power source such as a DC power unit to supply power on the system lines. This DC power unit supplies power at a fixed voltage and typically is current limited to providing a maximum current.

For wireless fire alarm systems, the initiation devices and notification appliance devices will typically be battery powered using either primary batteries or primary and secondary batteries. The primary batteries are typically used to power the low power components of the system. Alternatively, the secondary batteries typically provide power on an intermittent basis to notification units, for example, that are relatively high power components.

SUMMARY OF THE INVENTION

The notification units are a type of intermittent units that are only operated intermittently, typically on a temporary basis. Intermittent units are often characterized by having large inrush current demands and typically relatively high steady-state power consumption. The inrush current demand is the current required when the intermittent unit is first activated. In those moments, the transient current consumption is high. This can last for often several seconds to as long as 10 seconds or more. As time progresses, however, the current demand will trend toward the steady-state current draw and power consumption for the intermittent units.

Notification appliance devices that receive their power from the system controller or batteries can encounter insufficient power problems. Reliance on the fixed-size DC power unit of the system controller can constrain the number of devices that can be installed on a loop while still ensuring that the large inrush demands of the activated notification appliance devices are met. For battery powered units, charging phases may be required to store sufficient power required to meet the inrush current demand required to activate the intermittent units.

The present invention provides a solution to the above problems of insufficient power for wired and wireless fire alarm systems. The present invention provides an "instant-on" circuit design that meets power and inrush demands necessary for instantly operating the intermittent units.

In general, according to one aspect, the invention features a fire alarm system device having an intermittent unit that is intermittently activated, a power storage unit for providing temporary power to the intermittent unit, a voltage converter for providing power at a voltage required by the intermittent unit, and a power control circuit for discharging the power storage unit through the intermittent unit when the intermittent unit first is activated and then switching to enable the voltage converter to power the intermittent unit.

In embodiments, the voltage converter can include a back feed protection unit to ensure that the power storage unit discharges through the intermittent unit. The voltage converter can also provide power to charge the power storage unit. The intermittent unit can be a strobe and/or a horn. The power storage unit can be a supercapacitor.

The intermittent unit instantly operates when the power control circuit discharges the power storage unit through the intermittent unit which decreases a response time between detection of a fire condition and the operation of the intermittent unit. This response time is preferably less than 10 seconds.

The power control circuit can test the power storage unit by periodically discharging the power storage unit through a test load resistor under the control of a device controller to assess a capacity of the power storage unit.

In one embodiment, the fire alarm system device includes a wireless transceiver for wirelessly communicating with a system controller and a battery for providing power to the voltage converter. In another embodiment, the fire alarm system device includes a wired network interface for receiving power from a system network and supplying power to the voltage converter.

The fire alarm system device can include one or more batteries for providing power to the voltage converter and/or a device controller as well as one or more battery control circuits for testing the batteries by periodically discharging the batteries through test load resistors under the control of the device controller to assess battery reliability.

The fire alarm system device can include a device controller that controls the power control circuit to recharge the power storage unit typically less frequently than once a day. Also, the device controller can control the power control circuit to discharge the power storage unit through the intermittent unit until a current requirement of the intermittent unit is below a maximum current output for the voltage converter.

The fire alarm system device can further include an output control circuit for activating the intermittent unit by grounding the intermittent unit under control of a device controller.

In general, according to another aspect, the invention features a fire alarm system having one or more fire alarm devices, each of the devices including: an intermittent unit that is intermittently activated, a power storage unit for providing temporary power to the intermittent unit, a voltage converter for providing power at a voltage required by the intermittent unit, and a power control circuit for discharging the power storage unit through the intermittent unit when the intermittent unit first is activated and then switching to enable the voltage converter to power the intermittent unit. The fire alarm system also includes a system controller for controlling the fire alarm system devices.

In general, according to another aspect, the invention features a method for operating a fire alarm system device. The method includes an intermittent unit of the fire alarm system device being intermittently activated. After activation, temporary power is first provided to the intermittent unit from a power storage unit. Then, the intermittent unit is powered from a voltage converter.

The method can include a step of discharging of the power storage unit only through the intermittent unit. The method can also include a step of recharging the power storage no more frequently than once a day.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

This invention may be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
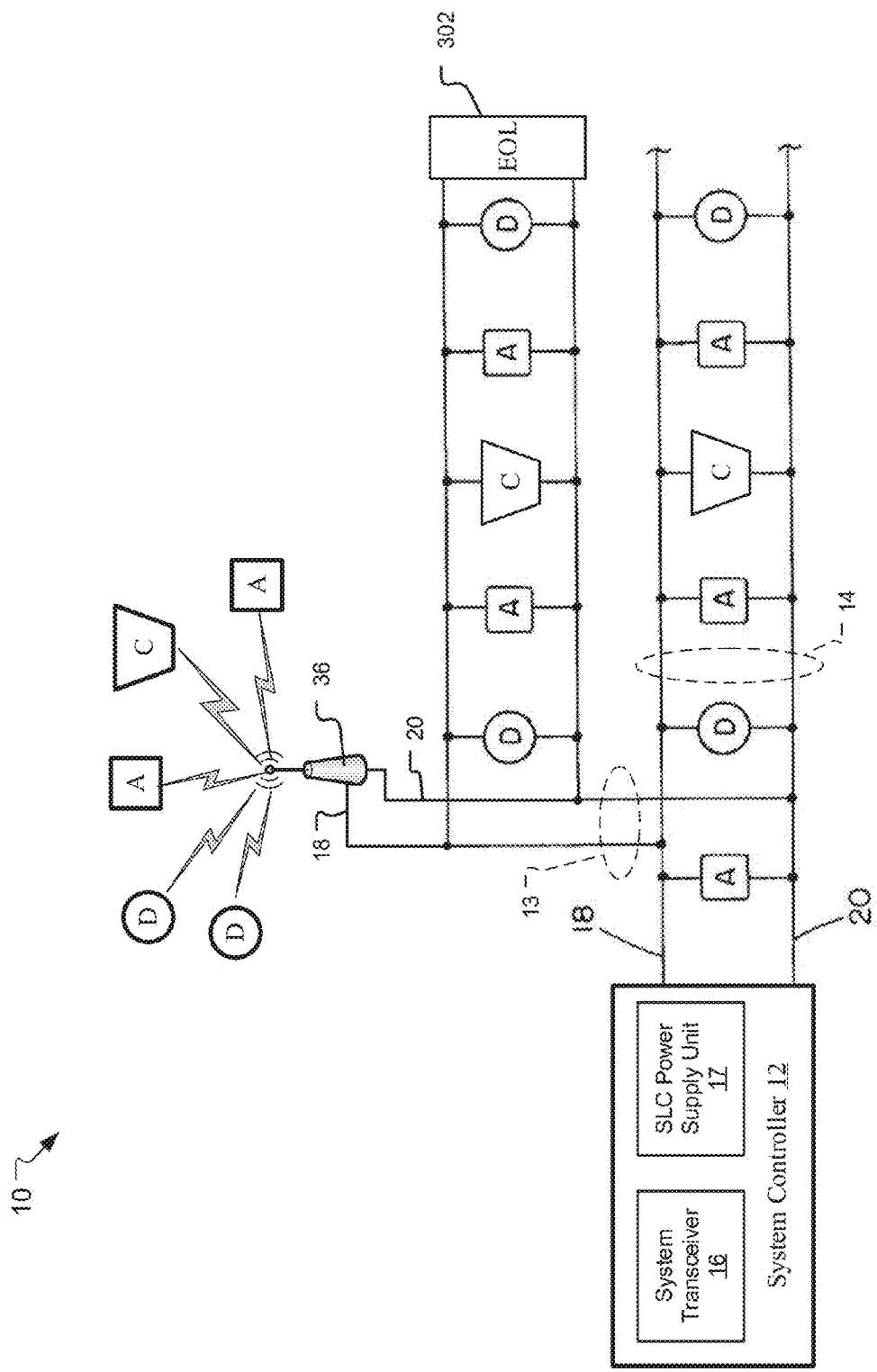
FIG. 1 is a schematic diagram of a fire alarm system including notification appliance devices, detector devices, and notification/detector combination devices.

FIG. 1 depicts a fire alarm system 10 including a system controller 12 for monitoring and/or activating fire alarm system devices. The system controller 12 monitors the initiation devices (detector devices D and notification/detector combination devices C) and activates the notification appliance devices A. For example, when fire conditions (i.e., smoke or heat) are detected by the initiation devices D, C, the initiation devices D, C send alarm signals to the system controller 12. The system controller 12 responds to the alarm signals by activating the notification appliance devices A to generate alert signals to indicate an alarm (i.e., alert occupants of a potential fire).

As appreciated by one of skill in the art, the fire alarm system 10 can include other fire alarm system devices such as auxiliary devices. The auxiliary devices can be door control devices, air handling unit control devices (exhaust fire floor, floor above fire, and floor below fire for example), devices for supplying extinguishing agent, and the like.

The system controller 12 is connected to some of the fire alarm system devices A, D, C via a wired system network 14. The wired system network 14 typically includes a common pair of system lines 18, 20 that form a signaling line circuit (SLC) loop. In the illustrated example, the fire alarm system 10 also includes a stub circuit 13 that extends off of the system lines 18, 20 for extending the system network 14. As appreciated by one of skill in the art, the fire alarm system 10 can include multiple system networks 14 (i.e., multiple common pairs of system lines 18, 20).

In another example, the fire alarm system 10 is completely wireless. For this example, the system network 14 (system lines 18, 20) and the stub circuit 13 are replaced with wireless networks. The system controller 12 communicates only wirelessly with all of the fire alarm system devices A, D, C in this example.

The system controller 12 uses a system transceiver 16 to communicate with the wired fire alarm system devices A, D, C. The system transceiver 16 transmits communication (e.g., different types of control signals) to the fire alarm system devices A, D, C via the system lines 18, 20. The system transceiver 16 also detects and decodes communications received from the fire alarm system devices A, D, C.

The system controller 12 can use the system transceiver 16 with an end-of-line (EOL) resistor 302 to test the system lines 18, 20 and detect a presence of wired fire alarm system devices A, D, C. In the illustrated example, the EOL resistor 320 is connected to both system lines 18, 20 at the end of the stub circuit 13. The system transceiver 16 sends a reverse polarity pulse periodically via the EOL resistor 302 to test the integrity of the system lines 18, 20 (i.e., confirm that SLC loop is complete). The system controller 12 can also detect the presence of fire alarm system devices A, D, C on the system lines 18, 20 by sending the same reverse polarity pulse via the EOL resistor 302 (i.e., determine whether any fire alarm system devices A, D, C are disconnected).

The system controller 12 also uses the system transceiver 16 or a separate wireless transceiver to communicate with wireless fire alarm system devices A, D. C via a wireless access point 36 or direction from the system controller unit. The wireless fire alarm system devices A, D, C access the system network 14 via the wireless access point 36. The system transceiver 16 can then transmit and receive different types of communication to and from the wireless fire alarm system devices A, D, C via the wireless access point 36.

The system controller 12 includes an SLC power supply unit 17 for providing system power to the fire alarm system devices A, D, C on the system lines 18, 20. The SLC power supply unit 17 can be a DC power unit that also includes battery back-up. The DC power unit supplies power at a fixed voltage and is limited to some maximum current on the system lines 18, 20, and the system lines themselves will have their own maximum current specifications. The wired fire alarm system devices A, D, C consume the system power for operating at least some of their internal components.

The wireless fire alarm system devices A, D, C rely on batteries for powering their internal components. The wireless fire alarm system devices A, D, C are battery powered using either primary batteries or primary and secondary batteries.

The notification appliance devices A are characterized as having large inrush current demands and relatively high steady-state power consumption when activated. The inrush current demand is the current required when the notification appliance device A is first activated. In those moments, the transient current consumption is high. As time progresses, however, the current demand will trend toward the steady-state current draw and power consumption.

The wired and wireless notification appliance devices A can encounter insufficient power problems and/or the number of devices with intermittent power units on a single loop can be limited due to their cumulative power requirements when a fire is first detected and the are contemporaneously activated. For wired notification appliance devices A, reliance exclusively on the fixed-size DC power unit of the system controller 12 can constrain the number of fire alarm system devices A, D, C that can be installed on the SLC loop while still ensuring that the large inrush demands of the activated notification appliance devices A are met. For wireless notification appliance devices A, charging phases may be required to store sufficient power required to meet the inrush current demand required to activate the wireless notification appliance devices A.

Figure 2A:
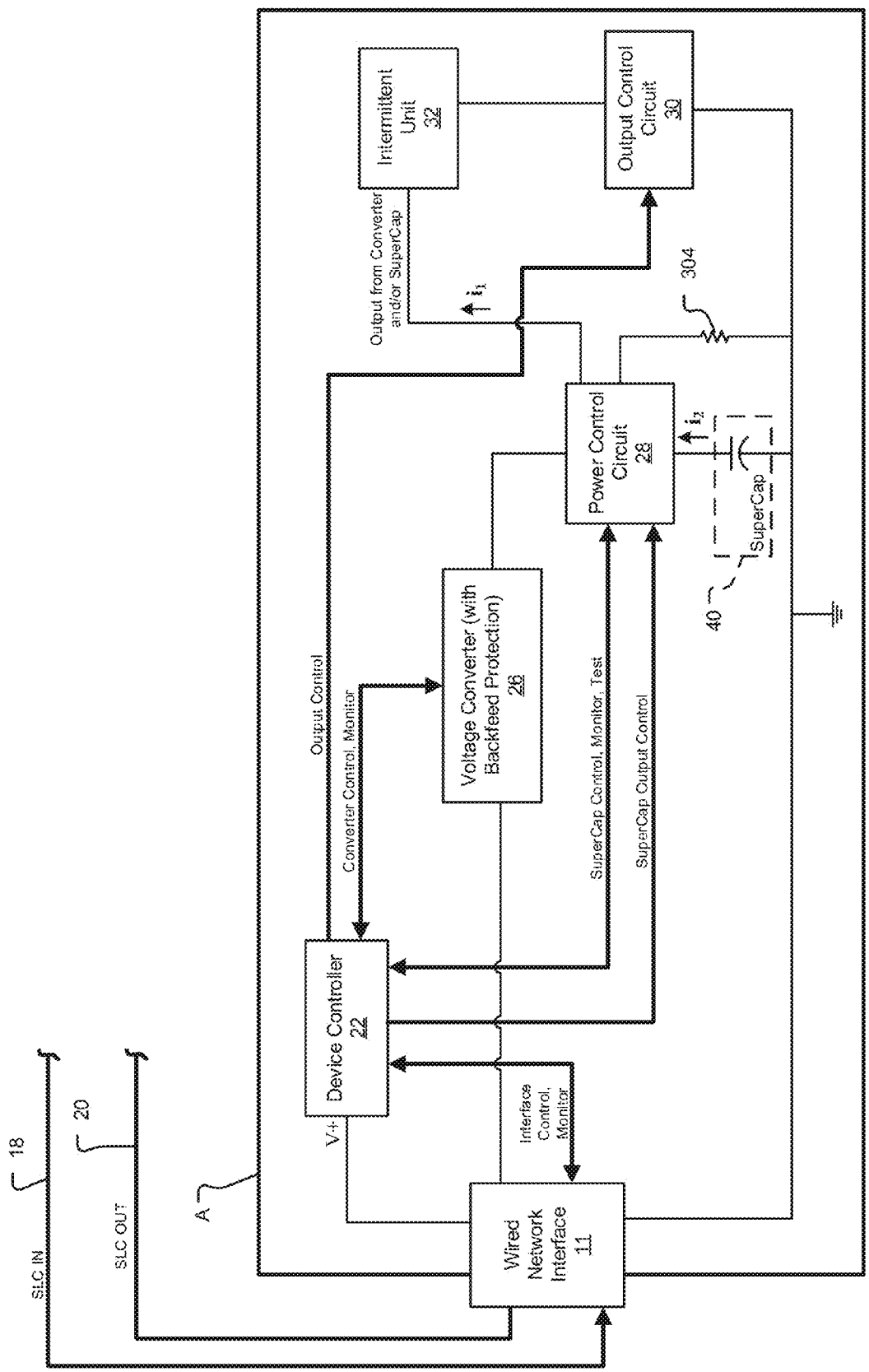
FIG. 2A is a detailed schematic view of a wired embodiment of the notification appliance device.

FIG. 2A schematically depicts the internal components of one example wired notification appliance device A that provides a solution to the above identified power problems. Some of the internal components include an intermittent unit 32, a power storage unit 40 (e.g., supercapacitor), a voltage converter 26, a power control circuit 28, and an output control circuit 30.

The intermittent unit 32 is only activated intermittently (typically on a temporary basis) in order to alert occupants of a potential fire. For example, the intermittent unit 32 is a horn, a strobe, or a combination audible/visible device. When activated, the intermittent unit 32 generates alert signals (e.g., audible signals for the horn or visible signals for the strobe) that indicate an alarm (i.e., potential fire) to occupants. The intermittent unit 32 has a large inrush current demand and relatively high steady-state power consumption when activated (i.e., turned on). This means that the intermittent unit 32 (e.g., strobe) requires a large amount of current in order to be activated. The intermittent unit 32 also typically operates at a higher voltage.

The power storage unit 40 provides temporary power to the activated intermittent unit 32. The power storage unit 40 provides enough power from a stored reservoir to meet or exceed the inrush current demand of the activated intermittent unit 32 (e.g., turn on strobe or turn on horn). The inrush current demand can be met or exceeded within several seconds. After the inrush current demand is met or exceeded, the power storage unit 40 continues to provide enough power to operate the intermittent unit 32 for several seconds. The power storage unit 40 provides power at a voltage required by the intermittent unit 32 for operation. The intermittent unit 32 instantly operates thereby decreasing a response time between detection of fire conditions and the operation of the intermittent unit 32 (i.e., reduce detection to notification time). This response time is preferably less than 10 seconds. For example, the response time is between 5 seconds and 10 seconds, or preferably less.

In examples, the power storage unit 40 can be a storage battery (e.g., rechargeable battery), a reserve battery (e.g., one-time use battery that is charged and then discharged until its power is exhausted), a supercapacitor, or the like. The power storage unit 40 is preferably a supercapacitor (having ultra-low leakage characteristics) that can store power for multiple days before self-discharging. As a result, this type of supercapacitor can store power for a long time period while minimally impacting battery life.

The voltage converter 26 provides power for operating the intermittent unit 32 as well as charging the power storage unit 40. As described above, the power storage unit 40 provides temporary power for instantly operating the intermittent unit 32. The voltage converter 26 includes a back feed protection unit (e.g., diodes or MOSFETs) to ensure that the power storage unit 40 provides the temporary power only through the activated intermittent unit 32 (i.e., direct current towards the intermittent unit 32). After the power storage unit 40 is discharged and/or the demand of the intermittent unit can be met by the voltage converter 26, the voltage converter 26 powers the intermittent unit 32 by providing power at the voltage required by the intermittent unit 32. The voltage converter 26 includes circuitry for converting power from one voltage to the voltage required by the intermittent unit 32 by stepping up voltage or stepping down voltage. The voltage converter 26 also provides power for charging the power storage unit 40. For example, the power storage unit 40 continues to provide temporary power until the voltage converter 26 can provide enough power to keep the power storage unit 40 charged at maximum capacity (with no diminishment in capacity) while the intermittent unit 32 is continuously operating.

The power control circuit 28 can shift between providing power to the intermittent unit 32 and charging the power storage unit 40. The power control circuit 28 discharges the power storage unit 40 through the intermittent unit 32 when the intermittent unit 32 first is activated and then switches to enable the voltage converter 26 to power the intermittent unit 32. The power control circuit 28 can shift to another mode enabling the voltage converter 26 to provide power to charge the power storage unit 40. In examples, the power control circuit 28 can be one or more bipolar junction transistors (BJTs), field-effect transistors (FETs), insulatedgate bipolar transistors (IGBTs), relays, metal-oxide-semiconductor field-effect transistors (MOSFETs), or mechanical switch, or the like.

The output control circuit 30 activates the intermittent unit 32 by grounding the intermittent unit 32. When the output circuit 30 is enabled, the intermittent unit 32 is grounded which closes the circuit between the power storage unit 40 and the intermittent unit 32. As result, the intermittent unit 32 is activated and the power storage unit 40 can provide the temporary power needed for operating the intermittent unit 32.

The notification appliance device A also includes a device controller 22 for directing the output control circuit 30, the power control circuit 28, and the voltage converter 26 in order to operate the intermittent unit 32. To activate the intermittent unit 32, the device controller 22 enables the output control circuit 30 to ground the intermittent unit 32 using an output control signal. The device controller 22 then directs the power control circuit 28 to discharge the power storage unit 40 (e.g., supercapacitor) through the intermittent unit 32 using a supercap output control signal. The device controller 22 directs the voltage converter 26 (using converter control signals) to provide power at the voltage required by the intermittent unit 32. The device controller 22 can also use monitor control signals to monitor the voltage converter 26. The device controller 22 directs these internal components based on communications received from the system controller 12. The device controller 22 can be a microprocessor, a microcontroller, an application-specific integrated circuit (ASIC) controller, or the like.

The device controller 22 also directs the power control circuit 28 to monitor and charge the power storage unit 40. For example, the device controller 22 directs the power control circuit 28 (using supercap control, monitor, and test signals) to test the power storage unit 40 by periodically discharging the power storage unit 40 via a storage unit test load resistor 304 (i.e., assess a capacity of the power storage unit 40). If the capacity is assessed as below some predefined threshold, the device controller 22 indicates a trouble condition to the system controller. In a preferred embodiment, the power storage unit 40 is recharged no more frequently than once a day or recharged periodically greater than a day. The power storage unit 40 is charged to full capacity and then periodically sampled/tested to determine if the power storage unit 40 has lost any power capacity and if necessary is recharged to maximum capacity. For example, the device controller 22 uses the power control circuit 28 to assess the capacity of the power storage unit 40 and then turns on the voltage converter 26 as needed to charge the power storage unit 40 once every couple of days. The device controller 22 can also use the power control circuit 28 to monitor integrity of the power storage unit 40.

In the illustrated example, the notification appliance device A uses a wired network interface 11 for connecting to the system network 14 (i.e., system lines 18, 20) and receiving system power for powering its internal components. The wired network interface 11 receives the system power from system lines 18, 20 and then provides the system power to the device controller 22 and the voltage converter 26 (i.e., powering control operations and notification operations). The voltage converter 26 changes the voltage of the system power to the voltage required by the intermittent unit 32 (i.e., steps up or steps down voltage). The voltage converter 26 provides this power (at the required voltage) to the power control circuit 28 for powering the intermittent unit 32 and/or charging the power storage unit 40. The voltage converter 26 can receive system power having either positive or negative voltage due to the voltage polarity of the system power being reversed. For example, if the system power has a negative voltage (e.g., during polling), the voltage converter 26 reverses the negative voltage to make the voltage positive. Then, the voltage converter 26 converts the positive voltage to the voltage required by the intermittent unit 32. The voltage converter 26 provides this converted power to the intermittent unit 32 and/or the power storage unit 40. When the system power has a positive voltage (e.g., during alarm conditions), the voltage converter 26 does not need to reverse the voltage.

The notification appliance device A also uses the network interface 11 for sending/receiving communications via the system network 14 (i.e., system lines 18, 20). The device controller 22 directs the wired network interface 11 to transmit communications using interface control signals. The device controller 22 monitors the wired network interface 11 for received communications using interface monitoring signals. In the illustrated example, the system lines 18, 20 include an input system line 18 (i.e., SLC in) and an output system line 20 (i.e., SLC out) together forming the SLC loop. The device controller 22 receives communications from the system controller 12 via the input system line 18 and then transmits communications 20 to the system controller 12 via the output system line 20.

Figure 2B:
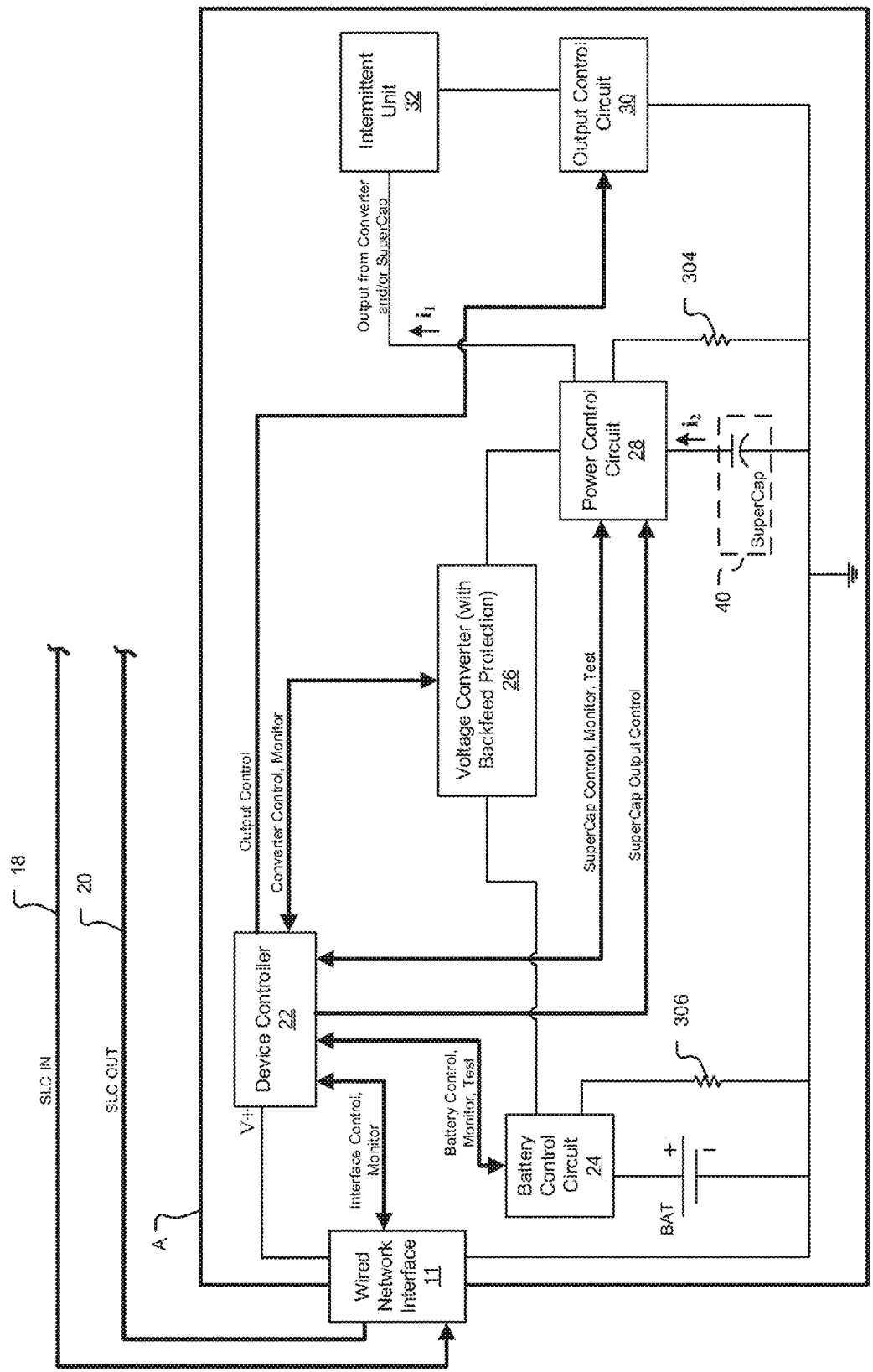
FIG. 2B is a detailed schematic view of another wired embodiment of the notification appliance device.

FIG. 2B illustrates another example wired notification appliance device A that provides another solution to the above identified power problems.

FIG. 2B is nearly identical to FIG. 2A except the notification appliance device A includes a battery BAT and a battery control circuit 24. The battery BAT provides battery power to the voltage converter 26 whereas the device controller 22 is powered by the system power (i.e., control operations are system powered and notification operations are battery powered). The device controller 22 can direct the battery control circuit 24 (using battery control, monitor, and test signals) to test the battery BAT by periodically discharging the battery BAT through a battery test load resistor 306 to assess battery reliability (e.g., test for low-battery end of life signal). The battery BAT is tested periodically under load to insure that the battery BAT is functional. Typically, the voltage required for operating the intermittent unit 32 is not the same as a battery voltage of the battery BAT. The voltage converter 26 converts the battery voltage of the battery power to the voltage required by the intermittent unit 32 (i.e., step up voltage or step down voltage). Thus, the voltage converter 26 can meet the power demands of the intermittent unit 32 by drawing battery power from the battery BAT as needed.

Figure 2C:
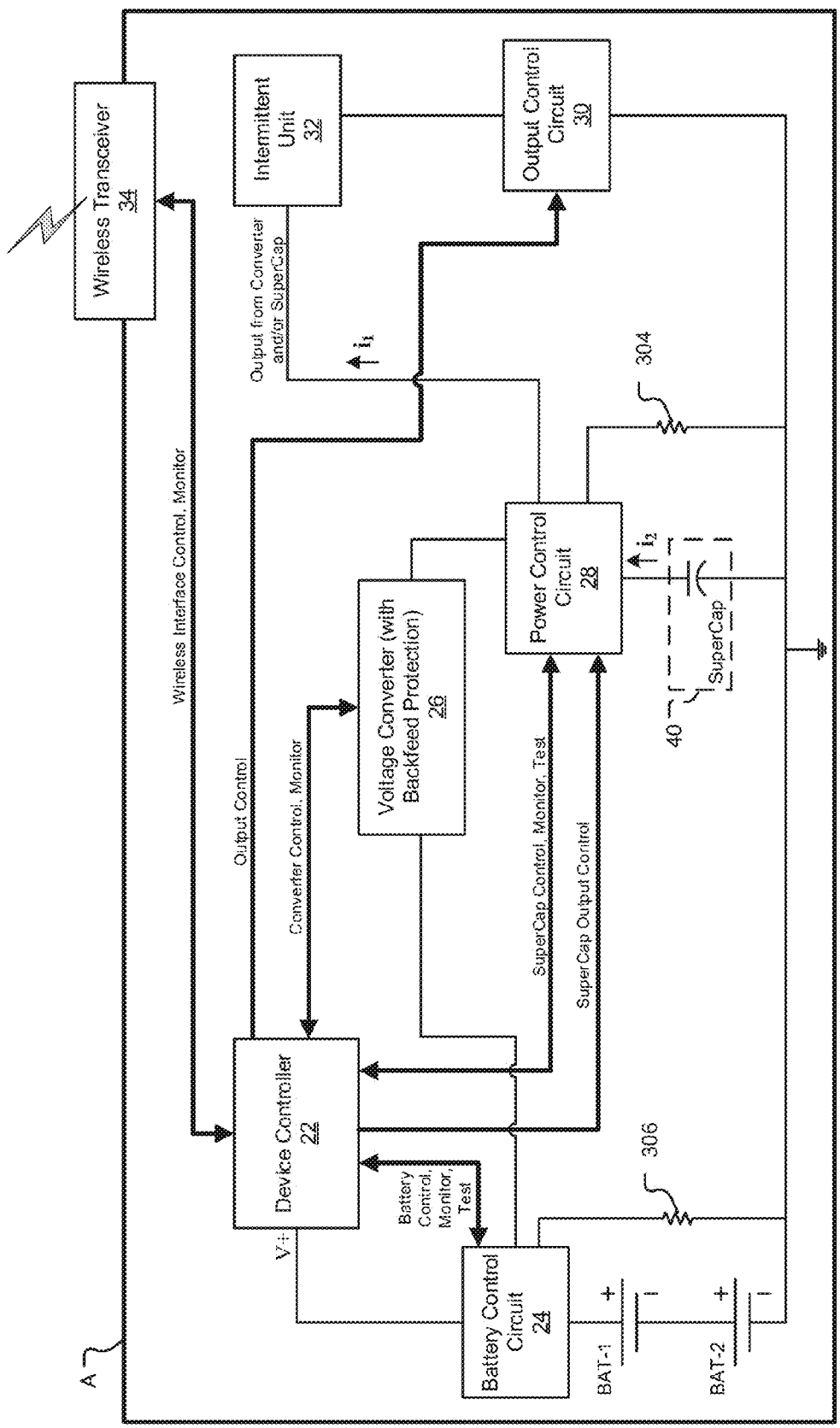
FIG. 2C is a detailed schematic view of a wireless embodiment of the notification appliance device.

FIG. 2C illustrates one example of a wireless notification appliance device A that provides another solution to the above identified power problems.

FIG. 2C is nearly identical to FIG. 2B except the notification appliance device A communicates wirelessly with the system controller 12 and has two batteries (first battery BAT-1 and second battery BAT-2). In this example embodiment, the notification appliance device A has a wireless transceiver 34 (e.g., RF transceiver) for wirelessly communicating with the system controller 12 via a wireless access point 36 (e.g., alarm/notification signals can be sent wirelessly). The device controller 22 directs the wireless transceiver 34 to transmit communications using wireless interface control signals. The device controller 22 monitors the wireless transceiver 34 for received communications using monitoring signals. The two batteries BAT-1, BAT-2 provide power to the voltage converter 26 and the device controller 22 (i.e., control operations and notification operations are battery powered). In the illustrated example, the two batteries BAT-1, BAT-2 are connected in series. The two batteries BAT-1, BAT-2 may be connected in parallel or connected in other ways as appreciated by one of skill in the art. The device controller 22 directs the battery control circuit 24 (using battery control, monitor, and test signals) to test the batteries BAT-1, BAT-2 by periodically discharging the batteries BAT-1, BAT-2 through the battery test load resistor 306 to assess battery reliability. In another example embodiment, only the first battery BAT-1 is included for providing power to the voltage converter 26 and the device controller 22 (i.e., notification appliance device A uses a single battery for all operations).

Figure 2D:
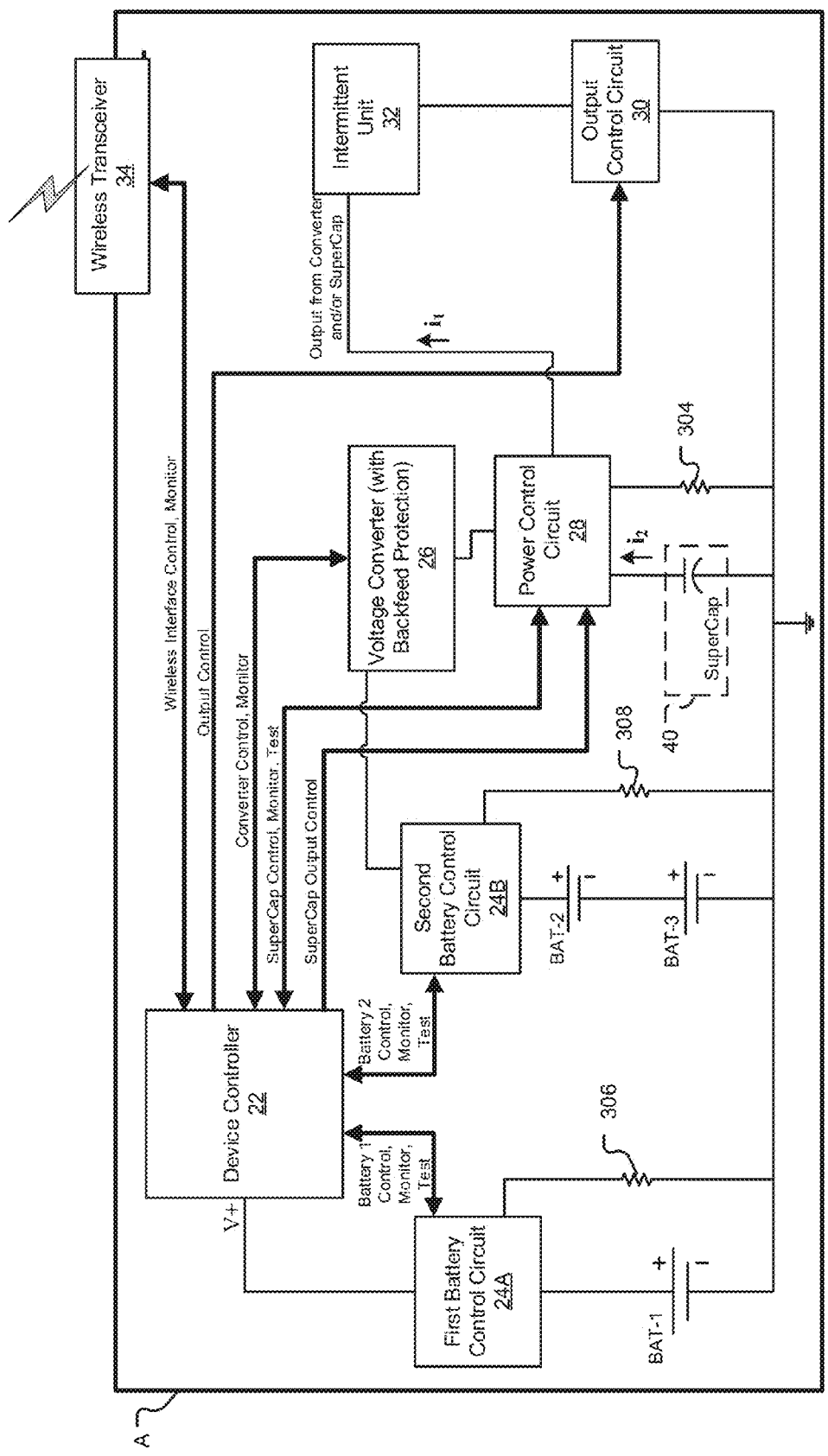
FIG. 2D is a detailed schematic view of another wireless embodiment of the notification appliance device.

FIG. 2D illustrates another example of the wireless notification appliance device A that provides another solution to the above identified power problems.

FIG. 2D is nearly identical to FIG. 2C except the wireless notification appliance device A has three batteries (first battery BAT-1, second battery BAT-2, and third battery BAT-3). In this example embodiment, the first battery BAT-1 provides power to the device controller 22. The second battery BAT-2 and third battery BAT-3 (connected in series) provide power to the voltage converter 26. As illustrated, the notification appliance device A includes a first battery control circuit 24A and a second battery control circuit 24B. The device controller 22 directs the first battery control circuit 24A to test the first battery BAT-1 by periodically discharging the first battery BAT-1 through the first battery test load resistor 306 to assess battery reliability. The device controller 22 also directs the second battery control circuit 24B to test the second and third batteries BAT-2, BAT-3 by periodically discharging the second and third batteries BAT-2, BAT-3 through a second battery test load resistor 308 to assess battery reliability. In another example embodiment, the wireless notification appliance device A includes only the first battery BAT-1 and the second battery BAT-2.

The example embodiments described above provide circuits that can be used to meet or exceed inrush demands of other types of intermittent units of other devices. While the above described circuits relate to notification device appliance devices A, these same circuits may be used with other devices that include intermittent units having large inrush demands. As appreciated by one of skill in the art, the above example embodiments may be utilized with other devices where it would be advantageous to meet inrush demands and decrease response time of intermittent units.

Figure 3:
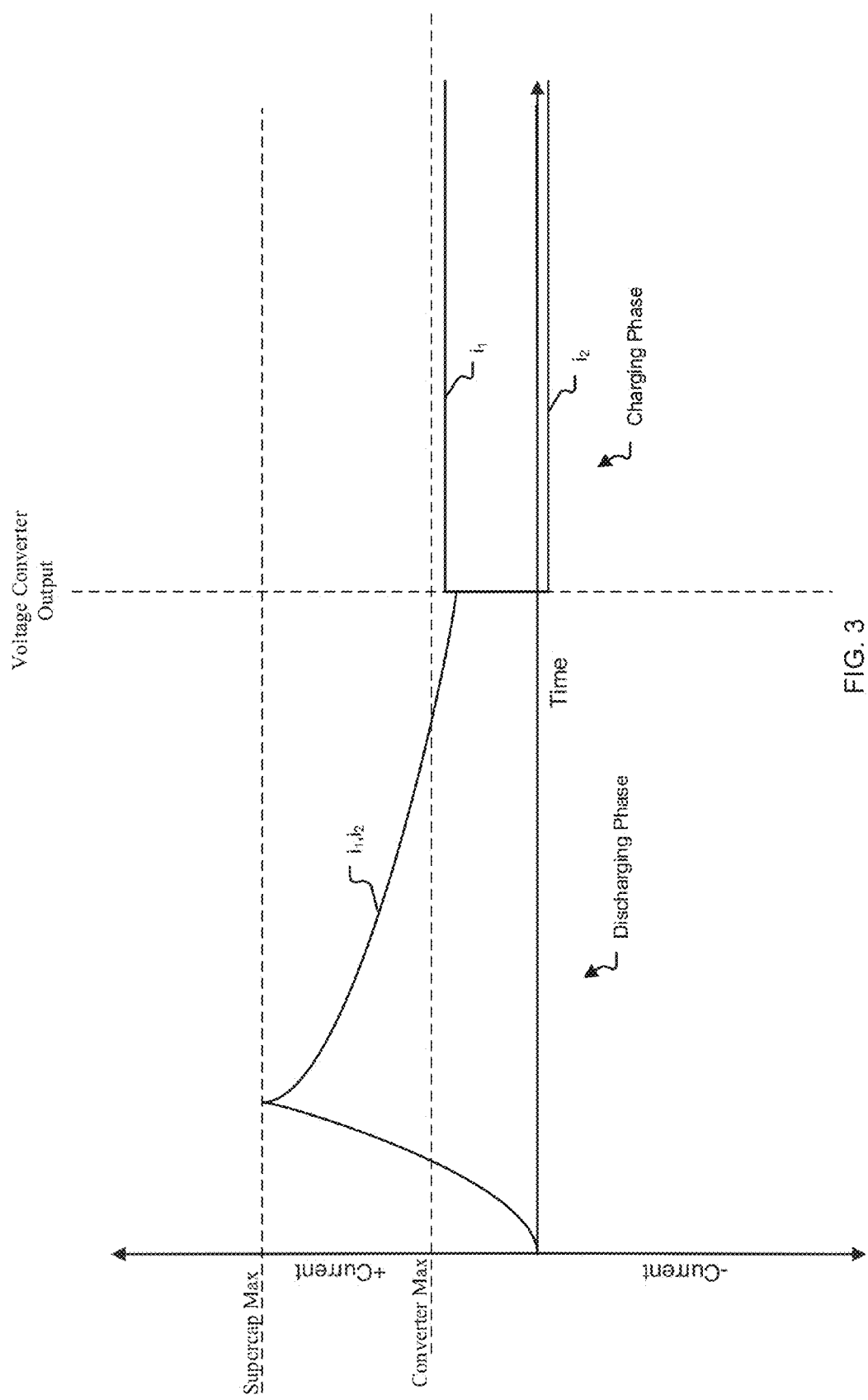
FIG. 3 is a plot of currents versus time for an intermittent unit and a supercapacitor of the notification appliance device.

FIG. 3 illustrates current plots for the notification appliance device A (either wireless or wired). As illustrated in FIGS. 2A-2D, $i_1$ corresponds to an intermittent current for the intermittent unit 32 and $i_2$ corresponds to a storage current for the power storage unit 40 (e.g., supercapacitor). FIG. 3 depicts current plots of the intermittent current $i_1$ and the storage current $i_2$ versus time. The current plots are split into two phases: a discharging phase (first section of plots) and a charging phase (second section of plots).

During the discharging phase, the power storage unit 40 is discharged through the intermittent unit 32. As illustrated, the plots of the intermittent current $i_1$ and the storage current $i_2$ are the same during the discharging phase. Both currents $i_1$, $i_2$ increase exponentially to a supercap max and then decrease gradually. These plots graphically illustrate the power storage unit 40 providing enough storage current $i_2$ to meet or exceed the inrush current demand (i.e., eliminate startup surges) of the intermittent unit 32. As described above, the intermittent unit 32 then instantly turns on which provides an "instant-on" circuit that can eliminates turn on delays (i.e., decrease the response time between detection of fire conditions and the operation of the intermittent unit 32). The discharging phase continues until the intermittent current $i_1$ (i.e., current required by the intermittent unit 32) is below a maximum current output ("converter max") for the voltage converter 26.

During the charging phase, the voltage converter 26 provides enough power to charge the power storage unit 40 and operate the intermittent unit 32. The charging phase starts when the power control circuit 28 shifts to enable the voltage converter 26 to provide power ("voltage converter output") to the power storage unit 40 and the intermittent unit 32. During the charging phase, the plot of the intermittent current $i_1$ gradually levels off near the maximum current output ("converter max") of the voltage converter 26 and the plot of the storage current $i_2$ instantly decreases to about zero current.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fire alarm device, comprising:
an intermittent unit that is intermittently activated;
a power storage unit for providing temporary power to the intermittent unit;
a voltage converter for providing power at a voltage required by the intermittent unit; and
a power control circuit for discharging the power storage unit through the intermittent unit when the intermittent unit first is activated and then switching to enable the voltage converter to power the intermittent unit.

2. The fire alarm device of claim 1, further comprising:
a wireless transceiver for enabling the fire alarm device to wirelessly communicate with a system controller; and
a battery for providing power to the voltage converter.

3. The fire alarm device of claim 1, wherein the voltage converter provides power to charge the power storage unit.

4. The fire alarm device of claim 1, further comprising a wired network interface for receiving power from a system network and supplying power to the voltage converter.

5. The fire alarm device of claim 1, further comprising
one or more batteries for providing power to the voltage converter; and
one or more battery control circuits for testing the batteries by periodically discharging the batteries through test load resistors under the control of the device controller to assess battery reliability.

6. The fire alarm device of claim 1, wherein the power control circuit tests the power storage unit by periodically discharging the power storage unit via a test load resistor under the control of a device controller to assess a capacity of the power storage unit.

7. The fire alarm device of claim 1, wherein the power storage unit is a supercapacitor.

8. The fire alarm device of claim 1, wherein the intermittent unit is a strobe or a horn.

9. The fire alarm device of claim 1, further comprising an output control circuit for activating the intermittent unit by grounding the intermittent unit under control of a device controller.

10. The fire alarm device of claim 1, wherein the voltage converter includes a back feed protection unit to ensure that the power storage unit discharges through the intermittent unit.

11. The fire alarm device of claim 1, further comprising a device controller that controls the power control circuit to recharge the power storage unit less frequently than once a day.

12. The fire alarm device of claim 1, further comprising a device controller that controls the power control circuit to discharge the power storage unit through the intermittent unit until a current requirement of the intermittent unit is below a maximum current output for the voltage converter.

13. The fire alarm device of claim 1, wherein the intermittent unit instantly operates when the power control circuit discharges the power storage unit through the intermittent unit which decreases a response time between detection of a fire condition and the operation of the intermittent unit.

14. The fire alarm device of claim 13, wherein the response time is less than 10 seconds.

15. A fire alarm system, comprising:
one or more fire alarm devices, each of the devices including: an intermittent unit that is intermittently activated, a power storage unit for providing temporary power to the intermittent unit, a voltage converter for providing power at a voltage required by the intermittent unit, and a power control circuit for discharging the power storage unit through the intermittent unit when the intermittent unit first is activated and then switching to enable the voltage converter to power the intermittent unit; and
a system controller for controlling the fire alarm system devices.

16. A method of operation of a fire alarm device, the method comprising:
intermittently activating an intermittent unit of the fire alarm device;
after activation, first providing temporary power to the intermittent unit from a power storage unit; and
then powering the intermittent unit with power from a voltage converter.

17. The method of claim 16, further comprising:
a system controller wirelessly communicating with the fire alarm system device; and
providing power to the voltage converter from a battery.

18. The method of claim 16, further comprising charging the power storage unit with the voltage converter.

19. The method of claim 16, further comprising receiving power from a system network and supplying power to the voltage converter.

20. The method of claim 16, further comprising
providing power to the voltage converter with one or more batteries; and
periodically testing the batteries by discharging the batteries through test load resistors to assess battery reliability.

21. The method of claim 16, further comprising testing the power storage unit by periodically discharging the power storage unit through a test load resistor to assess a capacity of the power storage unit.

22. The method of claim 16, wherein the power storage unit is a supercapacitor.

23. The method of claim 16, wherein the intermittent unit is a strobe or a horn.

24. The method of claim 16, further comprising activating the intermittent unit by grounding the intermittent unit under control of a device controller.

25. The method of claim 16, further comprising discharging the power storage unit only through the intermittent unit.

26. The method of claim 16, further comprising recharging the power storage unit no more frequently than once a day.

27. The method of claim 16, further comprising discharging the power storage unit through the intermittent until a current requirement of the intermittent unit is below a maximum current output for the voltage converter.

28. The method of claim 16, wherein after providing the temporary power to the intermittent unit, the intermittent unit operates instantly thereby decreasing a response time between detection of a fire condition and the operation of the intermittent unit.

29. The method of claim 28, wherein the response time is less than 10 seconds.

* * * * *